United States Patent
Jin et al.

(10) Patent No.: US 10,969,181 B2
(45) Date of Patent: Apr. 6, 2021

(54) METHOD FOR DIAGNOSING LACK OF COOLANT SUPPLIED TO COOLANT PUMP OF VEHICLE

(71) Applicants: Hyundai Motor Company, Seoul (KR); Kia Motors Corporation, Seoul (KR)

(72) Inventors: Young Pin Jin, Gyeonggi-do (KR); Jae Hun Jang, Jeollanam-do (KR); Jin Hun Lee, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 339 days.

(21) Appl. No.: 16/028,647

(22) Filed: Jul. 6, 2018

(65) Prior Publication Data
US 2019/0186853 A1 Jun. 20, 2019

(30) Foreign Application Priority Data
Dec. 15, 2017 (KR) .......................... 10-2017-0173594

(51) Int. Cl.
| F28F 27/00 | (2006.01) |
| G06F 1/20 | (2006.01) |
| H01M 8/04007 | (2016.01) |
| G01M 13/00 | (2019.01) |
| F01P 7/14 | (2006.01) |
| H01M 8/04298 | (2016.01) |

(52) U.S. Cl.
CPC ............. *F28F 27/00* (2013.01); *F01P 7/14* (2013.01); *G01M 13/00* (2013.01); *G06F 1/20* (2013.01); *H01M 8/04007* (2013.01); *H01M 8/04298* (2013.01)

(58) Field of Classification Search
CPC . F28F 27/00; F01P 7/14; G01M 13/00; G06F 1/20; H01M 8/04007; H01M 8/04298
See application file for complete search history.

(56) References Cited

U.S. PATENT DOCUMENTS

| 9,169,768 B2* | 10/2015 | Kim .................... F01P 7/026 |
| 2013/0125636 A1* | 5/2013 | Cwik ................ F02N 11/0855 |
| | | 73/115.05 |
| 2015/0267708 A1* | 9/2015 | Masuda ................ F04D 29/58 |
| | | 417/45 |

FOREIGN PATENT DOCUMENTS

KR 10-1535009 B1 7/2015

* cited by examiner

*Primary Examiner* — Bryan Bui
(74) *Attorney, Agent, or Firm* — Mintz Levin Cohn Ferris Glovsky and Popeo, P.C.; Peter F. Corless

(57) ABSTRACT

A method for diagnosing a lack of coolant includes: (a) determining whether a target revolution per minute (RPM) of a coolant pump is set to be constantly maintained for a first time, which is preset, or more, (b) calculating an actual average RPM and an actual average driving current of the coolant pump for a second time, which is preset to be shorter than the first time, when the target RPM is set to be constantly maintained for the first time, and (c) determining whether the coolant to be supplied to the coolant pump is insufficient, based on the actual average RPM and the actual average driving current.

17 Claims, 3 Drawing Sheets

METHOD FOR DIAGNOSING LACK OF COOLANT SUPPLIED TO COOLANT PUMP OF VEHICLE

CROSS-REFERENCE TO RELATED APPLICATION

This application claims under 35 U.S.C. § 119(a) the benefit of Korean Patent Application No. 10-2017-0173594, filed on Dec. 15, 2017 in the Korean Intellectual Property Office, the entire contents of which are incorporated by reference herein.

BACKGROUND

(a) Technical Field

The present disclosure relates to a method for diagnosing a lack of coolant, in particular, to a method of determining whether the coolant supplied to a coolant pump is insufficient.

(b) Description of the Related Art

In general, a fuel cell vehicle includes a fuel cell stack formed by stacking a plurality of fuel cells used as a power source; a fuel supply system, which supplies hydrogen serving as a fuel to the fuel cell stack; an air supply system, which supplies oxygen serving as an oxidant necessary for an electrochemical reaction; and a thermal management system which controls the temperature of the fuel cell stack.

A heat and water management system includes a coolant pump, which circulates coolant to the fuel cell stack; a radiator which cools the coolant discharged from the fuel cell stack; and a reservoir which stores the coolant. Conventionally, a water level sensor is mounted on the reservoir to measure the water level of the coolant such that a lack of coolant is diagnosed by using the water level sensor. However, when the lack of coolant is diagnosed by using the water level sensor, a package space for mounting the water level sensor may not be ensured. In addition, when coolant having air bubbles circulates, the water level sensor fails to sense the loss of coolant but frequently recognizes an amount of coolant as being at a normal level.

In order to solve the problem, a pressure sensor has been mounted on a coolant pipe and the lack of coolant has been diagnosed by using the pressure sensor. However, when the lack of coolant is diagnosed by using the pressure sensor, an erroneous sensing value may be frequently obtained due to the influence of a disturbance, that is, the temperature change of the coolant, a cooling loop change due to the opening and closing of a cooling line valve, or a vibration of a vehicle or equipment. Accordingly, a flow sensor is installed on the coolant pipe such that the lack of coolant is diagnosed by using the flow sensor. However, when the lack of coolant is diagnosed by using the flow sensor, the installation cost of the flow sensor may be increased. In addition, the placement of an additional pipe for the flow sensor is required and thus the flow sensor may not be easily installed.

SUMMARY

An aspect of the present disclosure provides a method for diagnosing a lack of coolant, which is improved to accurately diagnose the lack of coolant supplied from a coolant pump.

Another aspect of the present disclosure provides a method for diagnosing a lack of coolant, which is improved in part by reducing the number of parts used in diagnosing the lack of coolant According to an aspect of the present disclosure, a method for diagnosing a lack of coolant includes (a) determining whether a target revolution per minute (RPM) of a coolant pump is set to be constantly maintained for a first time, which is preset, or more; (b) calculating an actual average RPM and an actual average driving current of the coolant pump for a second time, which is preset to be shorter than the first time, when the target RPM is set to be constantly maintained for the first time; and (c) determining whether the coolant to be supplied to the coolant pump is insufficient, based on the actual average RPM and the actual average driving current.

Preferably, step (c) includes (b1) measuring actual RPMs and actual driving currents of the coolant pump by the preset number of times for the second time, and (b2) calculating the actual average RPM and the actual average driving current from the actual RPMs and the actual driving currents.

Preferably, step (c) includes (c1) determining that an amount of the coolant is equal to or less than a coolant insufficiency determining value, which is preset, when the actual average driving current is equal to or less than a reference driving current which is preset.

Preferably, the method further includes performing step (a) when the actual average driving current exceeds the reference driving current in step (c1).

Preferably, the step (c) further includes (c2) recording the determination that the amount of the coolant is equal to or less than the coolant insufficiency determining value, when determining that the amount of the coolant is equal to or less than the coolant insufficiency determining value, and (c3) definitively determining that the coolant is insufficient, when the determination that the amount of the coolant is equal to or less than the coolant insufficiency determining value is recorded by the reference number of times, which is preset, or more for a third time which is preset.

Preferably, the method further includes performing step (a), when the determination that the amount of the coolant is equal to or less than the coolant insufficiency determining value is recorded by the reference number of times or more for the third time in step (c3).

Preferably, the reference driving current is a driving current of the coolant pump for driving the coolant pump at the actual average RPM when the amount of the coolant is the coolant insufficiency determining value.

Preferably, the step (c) further includes: (c4) determining whether the actual average RPM is less than a first reference RPM, which is preset, and the actual average driving current is equal to or less than a first reference driving current which is preset, and (c5) determining whether the actual average RPM is equal to or greater than the first reference RPM and less than the second reference RPM and the actual average driving current is equal to or less than the first reference driving current and exceeds a second reference driving current, which is preset, when it is not determined that the actual average RPM is less than the first reference RPM and the actual average driving current is equal to and less than the first reference driving current. Step (c1) is performed, when it is not determined that the actual average RPM is equal to or greater than the first reference RPM and less than the second reference RPM and the actual average driving current is equal to or less than the first reference driving current and exceeds the second reference driving current.

Preferably, the reference driving current is the second reference driving current.

Preferably, the step (c1) is performed, when the actual average RPM is equal to or greater than the first reference RPM and less than the second reference RPM and the actual average driving current is equal to or less than the second reference driving current.

Preferably, the first reference RPM is determined to increase, at a preset ratio or more, a difference between a driving current, which is required for driving the coolant pump at the first reference RPM when the amount of the coolant is a preset coolant lack limit value, and a driving current which is required for driving the coolant pump at the first reference RPM when the amount of the coolant is the coolant insufficiency determining value.

Preferably, the second reference RPM is determined to increase, at a preset ratio or more, a difference between a driving current, which is required for driving the coolant pump at the second reference RPM when the amount of the coolant is a preset normal value, and a driving current which is required for driving the coolant pump at the second reference RPM when the amount of the coolant is the coolant insufficiency determining value.

Preferably, the first reference driving current is a driving current of the coolant pump required for driving the coolant pump at the actual average RPM when the amount of the coolant is the coolant lack limit value, and the second reference driving current is a driving current of the coolant pump for driving the coolant pump at the actual average RPM when the amount of the coolant is the coolant insufficiency determining value.

Preferably, the step (c) further includes (c6) re-setting the target RPM to be maintained to a third reference RPM, which is preset to be equal to or greater than the first reference RPM and less than the second reference RPM, for a fourth time, which is preset to be longer than the first time, when it is determined that the actual average RPM is less than the first reference RPM and the actual average driving current is equal to or less than the first reference driving current. Preferably, the step (a) is re-performed based on the re-set target RPM in step (c6).

Preferably, the step (c6) is performed when a first residual time elapses after it is determined that the actual average RPM is less than the first reference RPM and the actual driving current is equal to or less than the first reference driving current Preferably, the first residual time is increased at a preset ratio whenever the step (C6) is performed.

Preferably, the step (c) further includes (c7) re-setting the target RPM to be maintained to the second reference RPM for a fifth time which is preset to be longer than the first time, when it is determined that the actual average RPM is equal to or greater than the first reference RPM and less than the second reference RPM and the actual average driving current is equal to or less than the first reference driving current and exceeds the second reference driving current, the controller stands by for a second residual time. Preferably, the step (a) is re-performed based on the re-set target RPM.

Preferably, step (c7) is performed when a second residual time elapses after it is determined that the actual average RPM is equal to or greater than the first reference RPM and less than the second reference RPM and the actual driving current is equal to or less than the first reference driving current and exceeds the second reference driving current.

Preferably, the second residual time is increased at a preset ratio whenever the step (c7) is performed.

As described above, the present disclosure relates to the method for diagnosing the coolant and has the following effects.

First, according to the present disclosure, when the coolant is insufficient, by tracing the variation pattern of the RPM of the coolant pump and the variation pattern of the driving current of the coolant pump, it is possible to accurately diagnose the lack of coolant Second, according to the present disclosure, the lack of coolant is determined when the lack of coolant is sensed by the specific number of times for a specific time in consideration of the possibility of erroneous diagnosis. Accordingly, the accuracy of the diagnosis may be improved.

Third, according to the present disclosure, when the amount of the coolant is a specific limit value, the lack of coolant is precisely diagnosed, thereby improving the accuracy of the diagnosis.

Fourth, according to the present disclosure, since the lack of coolant is diagnosed by using the RPM and the driving current of the coolant pump, the number of parts necessary for diagnosing the lack of coolant may be reduced.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
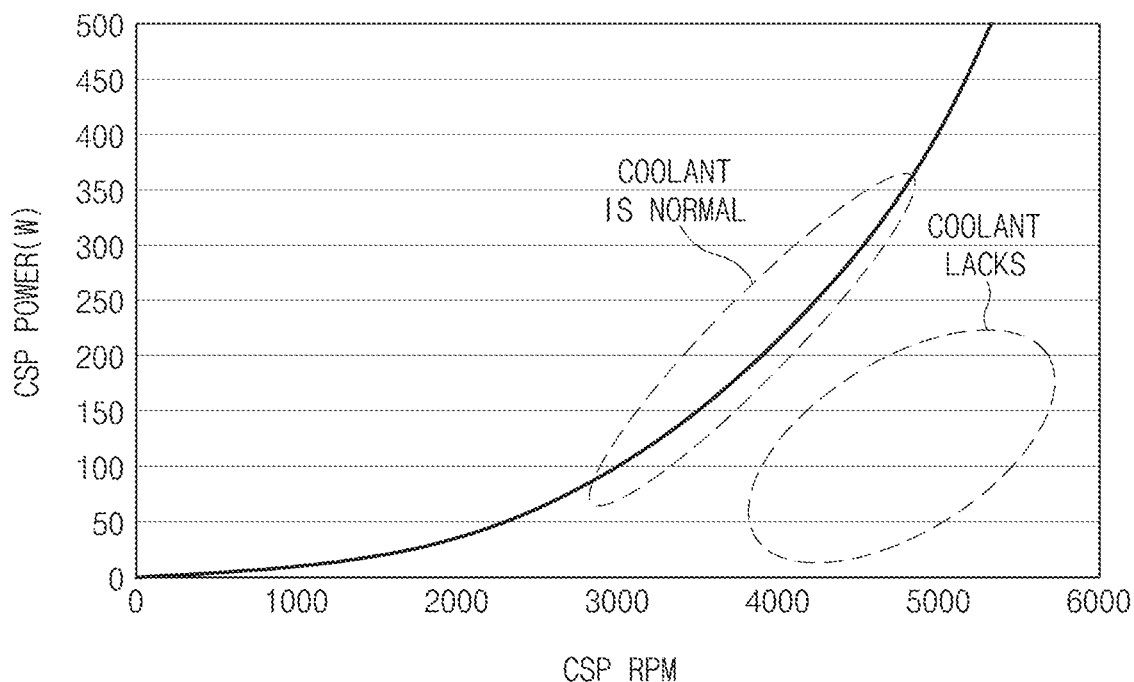
FIG. 1 is a graph illustrating the relationship between an RPM of a coolant pump and a driving current supplied to the coolant pump.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to accompanying drawings. In the following description, the same reference numerals will be assigned to the same elements even though the elements are illustrated in different drawings. In addition, in the following description of an embodiment of the present disclosure, a detailed description of well-known features or functions will be ruled out in order not to unnecessarily obscure the gist of the present disclosure.

In the following description of elements according to an embodiment of the present disclosure, the terms 'first', 'second', 'A', '(a)', and '(b)' may be used. The terms are used only to distinguish relevant elements from other elements, and the nature, the order, or the sequence of the relevant elements is not limited to the terms. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a graph illustrating the relationship between an RPM of a coolant pump and a driving current supplied to the coolant pump.

In general, when coolant to be provided to the coolant pump is insufficient (also referred to herein as "lack of coolant"), air bubbles are increased in the coolant, and thus the load on the coolant pump is reduced. Accordingly, as illustrated in FIG. 1, in the case of the lack of coolant, a driving current required for driving the coolant pump at a specific revolution per minute (RPMs) is reduced as compared to the case of a normal amount of coolant. In addition, the load on the coolant pump is reduced in the case of the lack of coolant and thus an actual RPM (RPMr) of the coolant pump fails to stably follow a target RPM (RPMt) set by a controller and oscillated. In this case, the an actual RPM (RPMr) of the coolant pump refers to a result value obtained by measuring a speed at which the coolant pump is actually rotated as the coolant pump is driven according to the target RPM (RPMt) set by the controller.

Figure 2:
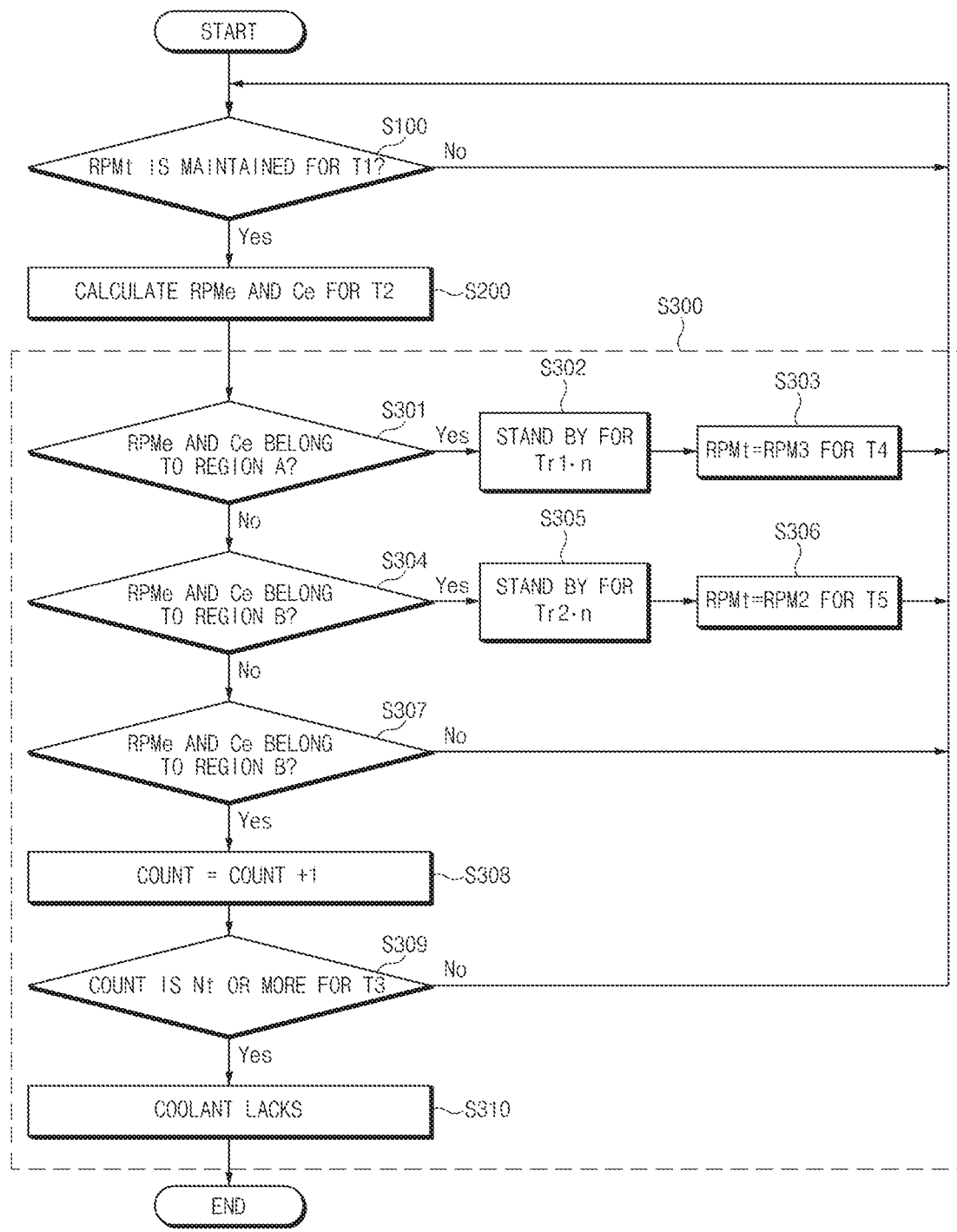
FIG. 2 is a flowchart illustrating a method for diagnosing a lack of coolant, according to an exemplary embodiment of the present disclosure.
Figure 3:
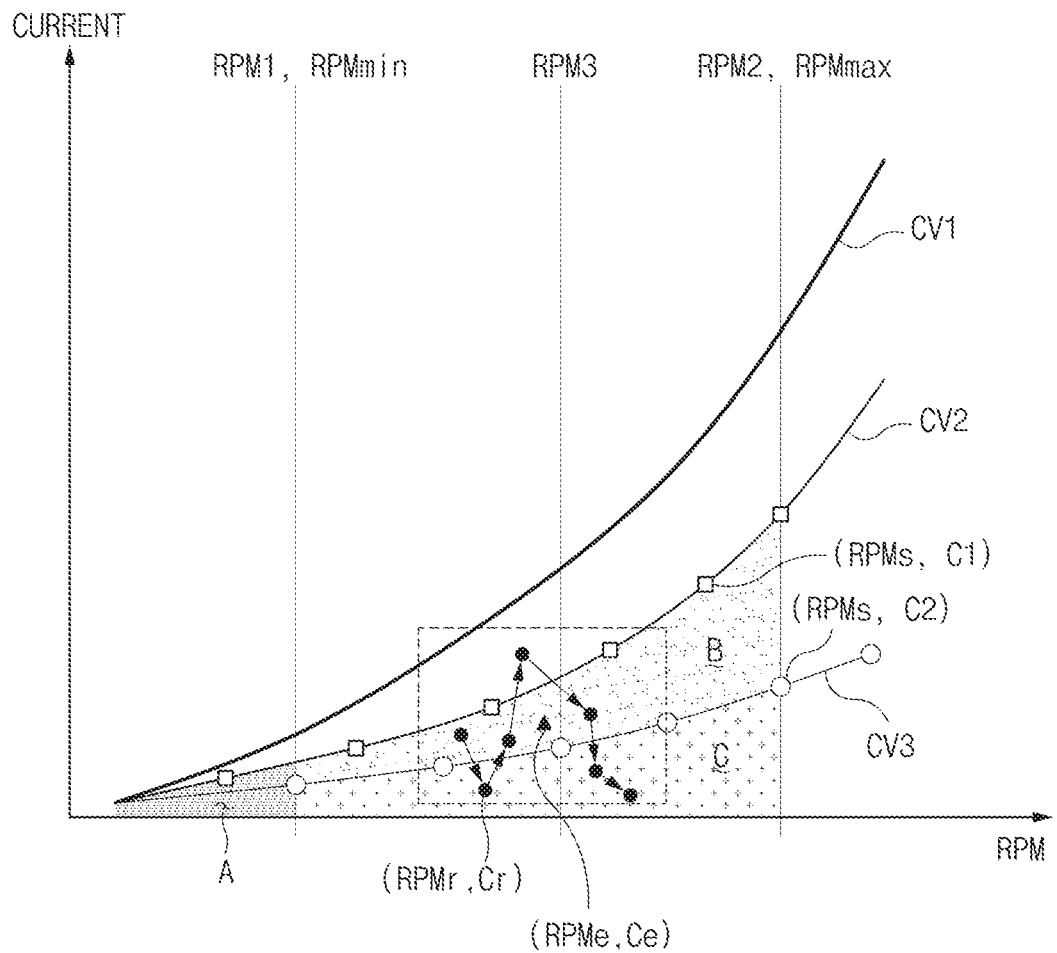
FIG. 3 is a graph for determining the lack of coolant based on the RPM of the coolant pump and a driving current of the coolant pump.

FIG. 2 is a flowchart illustrating a method for diagnosing the lack of coolant, according to an exemplary embodiment of the present disclosure, and FIG. 3 is a graph for determining the lack of coolant based on the RPM of the coolant pump and a driving current supplied to the coolant pump.

The method for diagnosing the lack of coolant according to an exemplary embodiment of the present disclosure is provided to sense the insufficiency of the coolant by using the phenomenon that a driving current required for driving the coolant pump is reduced in the case of the lack of coolant and the phenomenon that the actual RPM (RPMr) of the coolant pump fails to follow the target RPM (RPMt) and oscillated.

First, the controller determines whether the target RPM (RPMt) of the coolant pump is set to be maintained to the equal RPM for a first time T1, which is preset, or more (S100). In particular, as the target RPM (RPMt) of the coolant pump is changed during the diagnosis of the lack of coolant, an actual RPM (RPMr) of the coolant pump and an actual driving current (Cr) required for driving the coolant pump at the actual RPM (RPMr) are changed, and thus it is difficult to exactly diagnose the actual RPM (RPMr) and the lack of coolant based on the actual RPM (RPMr).

Next, the controller calculates an actual average RPM (RPMe) and an actual average driving current (Ce) for a second time (T2), which is preset, when determining that the target RPM (RPMt) of the coolant pump is set to be constantly maintained for the first time (T1) which is preset, or more (S200). The second time (T2) is not limited to a specific time, but may be set to be shorter than the first time T1. In other words, the second time (T2) is set to be shorter than the first time (T1) to measure the actual average RPM (RPMe) and the actual average driving current (Ce) within the first time T1 for which the target RPM (RPMt) of the coolant pump is constantly maintained.

The actual average RPM (RPMe) and the actual average driving current (Ce) may be set in various manners For example, as illustrated in FIG. 3, the controller may measure the actual RPMs (RPMr) by a preset number of times for the second time (T2) and may set the average value of the actual RPMs (RPMr) measured as described above as the actual average RPM (RPMe). The actual RPM (RPMr) may be measured in various manners. For example, the actual RPM (RPMr) may be measured by calculating the RPM of a driving motor of the coolant pump using a sensor, such as a hall sensor, or may be logically measured by using a current sensor for measuring the actual driving current (Cr).

For example, as illustrated in FIG. 3, the controller may measure, by the preset number of times, the actual driving currents (Cr) required for driving the coolant pump at the actual RPM (RPMr) for the second time (T2) and then may set the average value of the actual driving currents (Cr), which are measured as described above, as the actual average driving current (Ce). The actual driving current (Cr) may be measured in various manners. For example, the actual driving current (Cr) may be measured by using a current sensor such as a shunt resistor.

Thereafter, the controller may diagnose the lack of coolant by using the actual average RPM (RPMe) and the actual average driving current (Ce) (S300).

To this end, as illustrated in FIG. 3, the controller may diagnose the lack of coolant using a normal curve (CV1), a boundary curve (CV2), and a lack curve CV3 made by mapping the RPM of the coolant pump with the driving current of the coolant pump to represent the correlation between the RPM and the driving current of the coolant pump, when the amount of the coolant is a preset normal value, when the amount of the coolant is a preset coolant lack limit value, and when the amount of the coolant is a preset coolant insufficiency determining value, respectively. The preset coolant lack limit value refers to an amount of a coolant determined as that the accurate diagnosis of the lack of coolant is required, when taking into consideration the occurrence of the error in the measurement of the actual average RPM (RPMe) and the actual average driving current (Ce) although the lack of coolant is not determined. In addition, the preset coolant insufficiency determining value refers to an amount of a coolant definitely diagnosed as the lack of coolant (i.e., an insufficient amount of coolant).

The controller determines whether the actual average RPM (RPMe) is less than a first reference RPM (RPM1) and the actual average driving current (Ce) is equal to or less than a first reference driving current C1 (S301). In other words, the controller determines whether coordinates of the actual average RPM (RPMe) and the actual average driving current (Ce) belong to region A illustrated in FIG. 3.

In general, as the RPM of the coolant pump is lowered, the difference is reduced between the driving current of the coolant pump, when the coolant is in a normal amount, and the driving current of the coolant pump when the coolant is insufficient. Accordingly, when the RPM of the coolant pump is reduced to be equal to or less than a specific value, it is difficult to diagnose the lack of coolant through the driving current of the coolant pump.

The minimum RPM (RPMmin) illustrated in FIG. 3 is an RPM of the coolant pump increasing the difference between a driving current, which is required for driving the coolant pump at the minimum RPM (RPMmin) when the amount of the coolant is the coolant lack limit value, and a driving current which is required for the coolant pump at the minimum RPM (RPMmin) when the amount of the coolant is the coolant insufficiency determining value, at a preset ratio or more. In other words, the minimum RPM (RPMmin) is an RPM corresponding to a reference point allowing the diagnosis of the lack of coolant through the comparison between the boundary curve CV2 and the lack curve CV3. The controller may set the minimum RPM (RPMmin) to the first reference RPM (RPM1).

The first reference driving current (C1) is a driving current of the coolant pump required for driving the coolant pump at the actual average RPM (RPMe) when the amount of the coolant is the coolant lack limit value. The first reference driving current C1 is positioned on the boundary curve CV2.

The controller stands by for a first residual time (Tr1), which is preset, when the actual average RPM (RPMe) is less than the first reference RPM (RPM1) and the actual average driving current (Ce) is equal to or less than the first reference driving current C1 (S302). Then, the controller may set the target RPM (RPMt) of the coolant pump to be maintained to a third reference RPM (RPM3), which is preset to be equal to or greater than the first reference RPM (RPM1) and less than the preset second reference RPM (RPM2), for a fourth time (T4), which is preset to be longer than the first time (T1) (S303).

The maximum RPM (RPMmax) illustrated in FIG. 3 is an RPM of the coolant pump increasing the difference between a driving current, which is required for driving the coolant pump at the maximum RPM (RPMmax) when the amount of the coolant is the normal value, and a driving current, which is required for driving the coolant pump at the maximum RPM (RPMmax) when the amount of the coolant is the coolant insufficiency determining value, at a preset ratio or more. In other words, the maximum RPM (RPMmax) is an RPM corresponding to a reference point allowing the diagnosis of the lack of coolant through the comparison between the normal curve CV1 and the lack curve CV3. The controller may set the maximum RPM (RPMmax) to the second reference RPM (RPM2).

When the actual average RPM (RPMe) is less than the first reference RPM (RPM1) and the actual average driving current (Ce) is equal to or less than the first reference driving current C1, the difference is reduced between the driving current of the coolant pump when the amount of the coolant is the coolant lack limit value and the driving current of the coolant pump when the amount of the coolant is the coolant insufficiency determining value. Accordingly, the lack of coolant may be erroneously diagnosed due to the error in measurement of the actual average RPM (RPMe) and the actual average driving current (Ce). Accordingly, when the actual average RPM (RPMe) is less than the first reference RPM (RPM1) and the actual average driving current (Ce) is equal to or less than the first reference driving current (C1), the controller sets the target RPM (RPMt) to the third reference RPM (RPM3) which is equal to or less than the first reference RPM (RPM1) and less than the second reference RPM (RPM2) to reduce the possibility of the erroneous diagnosis of the lack of coolant by remarkably increasing the difference between the driving current of the coolant pump when the amount of the coolant is the coolant lack limit value and the driving current of the coolant pump when the amount of the coolant is the coolant insufficiency determining value.

The first residual time (Tr1) refers to time to prevent logic of diagnosing the lack of coolant from forming an infinite loop. It is preferred that the first residual time (Tr1) is increased at a specific ratio whenever the target RPM (RPMt) of the coolant pump is set to the third reference RPM (RPM3) again, but the present disclosure is not limited thereto.

The controller may return to operation S100 and start the logic of diagnosing the lack of coolant again when the target RPM (RPMt) of the coolant pump is set to the third reference RPM (RPM3) again.

When it is not determined that the actual average RPM (RPMe) is less than the first reference RPM (RPM1) and the actual average driving current (Ce) is equal to and less than the first reference driving current (C1), the controller determines whether the actual average RPM (RPMe) is equal to or greater than the first reference RPM (RPM1) and less than the second reference RPM (RPM2) and the actual average driving current (Ce) is equal to or less than the first reference driving current (C1) and exceeds the second reference driving current (C2), which is preset, (S304). In other words, the controller determines whether coordinates of the actual average RPM (RPMe) and the actual average driving current (Ce) belong to region B illustrated in FIG. 3.

The second reference driving current (C2) is a driving current of the coolant pump required for driving the coolant pump at the actual average RPM (RPMe) when the amount of the coolant is the coolant lack limit value and is positioned on the lack curve CV3.

When the controller determines that the actual average RPM (RPMe) is equal to or greater than the first reference RPM (RPM1) and less than the second reference RPM (RPM2) and the actual average driving current (Ce) is equal to or less than the first reference driving current C1 and exceeds the second reference driving current C2, the controller stands by for a second residual time (Tr2) (S305). Then, the controller may set the target RPM (RPMt) of the coolant pump to the second reference RPM (RPM2) such that the target RPM (RPMt) is maintained to the second reference RPM (RPM2) for a fifth time (T5) which is preset to be longer than the first time (T1) (S306). In other words, when the actual average RPM (RPMe) is equal to or greater than the first reference RPM (RPM1) and less than the second reference RPM (RPM2) and the actual average driving current (Ce) is equal to or less than the first reference driving current C1 and exceeds the second reference driving current C2, the controller sets the target RPM (RPMt) to the second reference RPM (RPM2) to reduce the possibility of the erroneous diagnosis of the lack of coolant by remarkably increasing the difference between the driving current of the coolant pump when the amount of the coolant is the normal value and the driving current when the amount of the coolant is the coolant insufficiency determining value.

The second residual time (Tr2) refers to time to prevent logic of diagnosing the lack of coolant from forming an infinite loop. It is preferred that the second residual time (Tr2) is increased at a specific ratio whenever the target RPM (RPMt) of the coolant pump is set to the second reference RPM (RPM2) again, but the present disclosure is not limited thereto.

The controller may return to operation S100 and start the logic of diagnosing the lack of coolant again when the target RPM (RPMt) of the coolant pump is set to the second reference RPM (RPM2) again.

When it is not determined that the actual average RPM (RPMe) is equal to or greater than the first reference RPM (RPM1) and less than the second reference RPM (RPM2) and the actual average driving current (Ce) is equal to or less than the first reference driving current C1 and exceeds the second reference driving current C2, the controller whether the actual average RPM (RPMe) is equal to or greater than the first reference RPM (RPM1) and less than the second reference RPM (RPM2) and the actual average driving current (Ce) is equal to or less than the second reference driving current C2 (S307). In other words, the controller determines whether coordinates of the actual average RPM (RPMe) and the actual average driving current (Ce) belong to region C illustrated in FIG. 3.

When it is determined that the actual average RPM (RPMe) is equal to or greater than the first reference RPM (RPM1) and less than the second reference RPM (RPM2) and the actual average driving current (Ce) is equal to or less than the second reference driving current C2, the controller determines that the amount of the coolant is equal to or less than the coolant insufficiency determining value (S308).

After recording, in a storage medium, the determination that the amount of the coolant is equal to or less than the coolant insufficiency determining value, the controller determines whether the determination that the amount of the coolant is equal to or less than the coolant insufficiency determining value is recorded in the storage medium by a preset reference number of times (Nt) or more for the preset third time (T3) (S309). The third time (T3) is set to be shorter than the first time (T1) and longer than the second time (T2) to count the number of times of determining that that the amount of the coolant is equal to or less than the coolant insufficiency determining value.

The controller definitively diagnoses that the coolant is insufficient when the determination that the amount of the coolant is equal to or less than the coolant insufficiency determining value is recorded in the storage medium by the reference number of times (Nt) or more for the third time (T3). In other words, if the controller instantly diagnoses that the coolant is insufficient when the determination that the amount of the coolant is equal to or less than the coolant insufficiency determining value is recorded in the storage medium once, an erroneous diagnosis result may be made.

Accordingly, as the result of taking into consideration the above problem, the controller diagnoses that the coolant is insufficient when the lack of coolant is sensed by the specific frequency or more.

When the determination that the amount of the coolant is equal to or less than the coolant insufficiency determining value is recorded in the storage medium by the reference number of times (Nt) or more for the third time (T3), the controller may return to operation S100.

According to the method for diagnosing the lack of coolant, the lack of coolant may be diagnosed by tracing the variation pattern of the RPM of the coolant pump and the variation pattern of the driving current of the coolant pump, which result from the lack of coolant. Therefore, according to the method for diagnosing the lack of coolant, the accuracy of the diagnosis may be improved as compared to the case of diagnosing the lack of coolant by tracking only any one of the variation pattern of the RPM of the coolant pump and the variation pattern of the driving current of the coolant pump.

In addition, according to the method for diagnosing the lack of coolant, the accuracy of the diagnosis may be improved by tacking whether the amount of the coolant is between the coolant lack limit value and the coolant insufficiency determining value based on the error possibility in measuring the actual RPM (RPMr) and the actual driving current (Cr).

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. A method for diagnosing a lack of coolant, the method comprising:
   (a) determining whether a target revolution per minute (RPM) of a coolant pump is set to be constantly maintained for a first time, which is preset, or more;
   (b) calculating an actual average RPM and an actual average driving current of the coolant pump for a second time, which is preset to be shorter than the first time, when the target RPM is set to be constantly maintained for the first time; and
   (c) determining whether the coolant to be supplied to the coolant pump is insufficient, based on the actual average RPM and the actual average driving current,
   wherein the calculating of the actual average RPM and the actual average driving current includes:
   calculating the actual average RPM from actual RPMs measured by using a sensor and the actual average driving current from actual driving currents measured by using a current sensor, which the actual RPMs and actual driving currents of the coolant ump are measured by the preset number of times for the second time,
   wherein the determining of whether the coolant to be supplied to the coolant pump is insufficient includes:
   (c1) determining that an amount of the coolant is equal to or less a coolant insufficiency determining value, which is preset, when the actual average driving current is equal to or less than a reference diving current which is preset.

2. The method of claim 1, further comprising:
performing determining of whether the target RPM of the coolant pump is set to be constantly maintained for the first time or more when the actual average driving current exceeds the reference driving current.

3. The method of claim 1, wherein the determining of whether the coolant to be supplied to the coolant pump is insufficient further includes:
   (c2) recording the determination that the amount of the coolant is equal to or less than the coolant insufficiency determining value, when determining that the amount of the coolant is equal to or less than the coolant insufficiency determining value; and
   (c3) definitively determining that the coolant is insufficient, when the determination that the amount of the coolant is equal to or less than the coolant insufficiency determining value is recorded by the reference number of times, which is preset, or more for a third time which is preset.

4. The method of claim 3, further comprising:
performing determining of whether the target RPM of the coolant pump is set to be constantly maintained for the first time or more, when the determination that the amount of the coolant is equal to or less than the coolant insufficiency determining value is recorded by the reference number of times or more for the third time.

5. The method of claim 1, wherein the reference driving current is a driving current of the coolant pump for driving the coolant pump at the actual average RPM when the amount of the coolant is the coolant insufficiency determining value.

6. The method of claim 1, wherein the determining of whether the coolant to be supplied to the coolant pump is insufficient further includes:
   (c4) determining whether the actual average RPM is less than a first reference RPM, which is preset, and the actual average driving current is equal to or less than a first reference driving current which is preset; and
   (c5) determining whether the actual average RPM is equal to or greater than the first reference RPM and less than the second reference RPM and the actual average driving current is equal to or less than the first reference driving current and exceeds a second reference driving current, which is preset, when it is not determined that the actual average RPM is less than the first reference RPM and the actual average driving current is equal to and less than the first reference driving current, and
   wherein the determining that the amount of the coolant is equal to or less than the coolant insufficiency determining value is performed, when it is not determined that the actual average RPM is equal to or greater than the first reference RPM and less than the second reference RPM and the actual average driving current is equal to or less than the first reference driving current and exceeds the second reference driving current.

7. The method of claim 6, wherein the reference driving current is the second reference driving current.

8. The method of claim 6, wherein the determining that the amount of the coolant is equal to or less than the coolant insufficiency determining value is performed, when the actual average RPM is equal to or greater than the first reference RPM and less than the second reference RPM and the actual average driving current is equal to or less than the second reference driving current.

9. The method of claim 6, wherein the first reference RPM is determined to increase, at a preset ratio or more, a difference between a driving current, which is required for driving the coolant pump at the first reference RPM when the amount of the coolant is a preset coolant lack limit value, and a driving current which is required for driving the coolant pump at the first reference RPM when the amount of the coolant is the coolant insufficiency determining value.

10. The method of claim 9, wherein the second reference RPM is determined to increase, at a preset ratio or more, a difference between a driving current, which is required for driving the coolant pump at the second reference RPM when the amount of the coolant is a preset normal value, and a driving current which is required for driving the coolant pump at the second reference RPM when the amount of the coolant is the coolant insufficiency determining value.

11. The method of claim 9, wherein the first reference driving current is a driving current of the coolant pump required for driving the coolant pump at the actual average RPM when the amount of the coolant is the coolant lack limit value, and
   wherein the second reference driving current is a driving current of the coolant pump for driving the coolant pump at the actual average RPM when the amount of the coolant is the coolant insufficiency determining value.

12. The method of claim 6, wherein the determining of whether the coolant to be supplied to the coolant pump is insufficient further includes:
   (c6) re-setting the target RPM to be maintained to a third reference RPM, which is preset to be equal to or greater than the first reference RPM and less than the second reference RPM, for a fourth time, which is preset to be longer than the first time, when it is determined that the actual average RPM is less than the first reference RPM and the actual average driving current is equal to or less than the first reference driving current, and
   wherein the determining of whether the target RPM is set to be constantly maintained for the first time or more is re-performed based on the re-set target RPM.

13. The method of claim 12, wherein the re-setting of the target RPM to be maintained to the third reference RPM is performed when a first residual time elapses after it is determined that the actual average RPM is less than the first reference RPM and the actual driving current is equal to or less than the first reference driving current.

14. The method of claim 13, wherein the first residual time is increased at a preset ratio whenever the re-setting of the target RPM to be maintained to the third reference RPM is re-performed.

15. The method of claim 6, wherein the determining of whether the coolant to be supplied to the coolant pump is insufficient further includes:
   (c7) re-setting the target RPM to be maintained to the second reference RPM for a fifth time which is preset to be longer than the first time, when it is determined that the actual average RPM is equal to or greater than the first reference RPM and less than the second reference RPM and the actual average driving current is equal to or less than the first reference driving current and exceeds the second reference driving current, the controller stands by for a second residual time, and
   wherein the determining of whether the target RPM is set to be constantly maintained for the first time or more is re-performed based on the re-set target RPM.

16. The method of claim 15, wherein the re-setting of the target RPM to be maintained to the second reference RPM for the fifth time is performed when a second residual time elapses after it is determined that the actual average RPM is equal to or greater than the first reference RPM and less than the second reference RPM and the actual driving current is equal to or less than the first reference driving current and exceeds the second reference driving current.

17. The method of claim 16, wherein the second residual time is increased at a preset ratio whenever the re-setting of the target RPM to be maintained to the second reference RPM is performed for the fifth time.

* * * * *